United States Patent
Barat

(10) Patent No.: US 6,655,206 B1
(45) Date of Patent: Dec. 2, 2003

(54) DEVICE USING A LOCAL IRREGULARITY TO REDUCE THE EXTENT OF UNWANTED MOVEMENTS OF WEATHER BALLOONS

(76) Inventor: Jean Barat, Moulin du Haut, 33190, Noaillac (FR)

( * ) Notice: Subject to any disclaimer, the term of this patent is extended or adjusted under 35 U.S.C. 154(b) by 0 days.

(21) Appl. No.: 09/926,527

(22) PCT Filed: May 18, 2000

(86) PCT No.: PCT/FR00/01343

§ 371 (c)(1),
(2), (4) Date: Dec. 31, 2001

(87) PCT Pub. No.: WO00/70369

PCT Pub. Date: Nov. 23, 2000

(30) Foreign Application Priority Data

May 18, 1999 (FR) .............................. 99 06270
Jan. 4, 2000 (FR) .............................. 00 00047

(51) Int. Cl.$^7$ ................................ G01W 1/00
(52) U.S. Cl. ..................... 73/170.01; 244/31
(58) Field of Search ............. 78/170.01, 170; 244/212, 215, 216, 24, 31; 343/706; 362/32

(56) References Cited

U.S. PATENT DOCUMENTS 3,340,732 A    9/1967   Scoggins
4,112,753 A  * 9/1978   Call ....................... 73/170.28
4,956,646 A  * 9/1990   Miller et al. .............. 343/706
5,788,190 A  * 8/1998   Siers ....................... 244/212
5,857,760 A  * 1/1999   Pelton ..................... 362/554

FOREIGN PATENT DOCUMENTS

FR    2755245    4/1998
FR    2759787    8/1998
FR    2775352    8/1999

* cited by examiner

Primary Examiner—Edward Lefkowitz
Assistant Examiner—Alandra Ellington
(74) Attorney, Agent, or Firm—Dennison, Schultz & Dougherty

(57) ABSTRACT

A meteorological balloon having improved wind measurement during an ascent stage, includes an inflatable envelope having, during ascent, an upper hemisphere and a lower hemisphere, and presenting an outer surface, a GPS type sonde secured to the inflatable envelope, and a device for improving wind measurement which is a single spoiler secured to the upper hemisphere portion envelope. The spoiler is constructed and arranged to transmit any aerodynamic force acting thereon to the balloon and to modify air streams following the outside surface of the balloon so as to prevent the air streams from adhering to the outer surface of the bottom hemisphere of the balloon during ascent.

16 Claims, 6 Drawing Sheets

DEVICE USING A LOCAL IRREGULARITY TO REDUCE THE EXTENT OF UNWANTED MOVEMENTS OF WEATHER BALLOONS

BACKGROUND OF THE INVENTION

The present invention relates to a device intended to attenuate or even eliminate the unwanted movements to which weather balloons are subject during ascent. The device is more particularly intended for balloons of the closed type in which the envelope is made of an elastic material and which serves to-measure wind in the atmosphere, i.e. to measure wind speed and direction. To perform such measurements, balloons are tracked either by a global positioning system (GPS) transponder integrated in a radiosonde secured beneath the balloon, or else by tracking radar. In order to enable wind speed to be measured under good conditions, it is necessary for the balloon to follow as accurately as possible the movements of the atmosphere, which is not true of conventional balloons. When a sonde is suspended beneath a normal weather balloon of substantially spherical shape, it is subjected during the ascent stage to oscillations of very large amplitude. These oscillations are created by unwanted movements of the balloon itself, and if accurate wind speed measurements are desired, it is essential to minimize the amplitude of the unwanted movements of the balloon throughout the ascent stage.

SUMMARY OF THE INVENTION

An object of the present invention is to improve the quality of wind measurements made during the ascent of weather balloons presenting an inflatable envelope fitted with at least one GPS type sonde. According to the invention, this object is achieved by the balloon being provided with a device that comprises a spoiler secured to a portion of the wall of said balloon that is situated in the top hemisphere of said balloon during ascent, in such a manner that said spoiler transmits any aerodynamic force acting thereon to said balloon and said spoiler modifies the air streams following the outside surface of said balloon so as to prevent said air streams from adhering to the surface of the bottom hemisphere of said balloon during ascent.

The device of the invention can significantly increase the stability of a balloon during its ascent, the device being more specifically adapted to weather balloons of the closed type having an elastic envelope. It is well known that during the ascent of such balloons, air flow conditions can be supercritical, which means that air streams adhere in laminar manner to the wall over a large fraction of the bottom hemisphere of the balloon. These conditions give rise to instabilities in the movement of the balloon, and consequently to poor tracking of the wind by the balloon. It is therefore essential to ensure that conditions are no longer supercritical and thus that air streams separate from the wall of the balloon before reaching the bottom hemisphere. The object of the present invention is to ensure that such separation takes place so as to obtain good measurements of wind speed.

Thus, according to a first characteristic of the invention, air streams are caused to separate from the top hemisphere of the balloon during ascent by means of a single spoiler fixed rigidly to the wall of the leading (top) hemisphere of the balloon, with the size of the separation spoiler being selected to be large enough to generate a turbulent wake which is capable of spreading by degrees to adjacent streams, thereby disturbing the flow over very large portions of the balloon.

In a preferred embodiment, said spoiler is constituted by a plate-forming element having sharp edges and having a mean plane that intersects the surface defined by said balloon. In order to fix said spoiler or said element, the device advantageously further comprises a system including a spar suitable for connecting said spoiler to said wall portion of said balloon, said spar being secured to said envelope of said balloon.

Thus, the spar is suitable for being fixed to the balloon and said spoiler is suitable for fixing to the spar. In order to fix the spar to the balloon, it is preferable for said spar to present an internal shoulder formed by an external clamp and for the system to include an elastically deformable part inside said balloon suitable for being engaged inside said spar so as to bear against said internal shoulder and pinch said envelope between said part and said spar, thereby fixing said spar to said portion of the wall of said balloon.

It will be understood that the spar must be deformable so as to enable the clamp to be placed around said spar and form the internal shoulder.

In practice, the elastically deformable piece and the non-inflated balloon portion corresponding to the wall portion situated in the top hemisphere are inserted together into the spar which is initially tubular in shape. Thereafter, the bottom portion of the spar is clamped using the clamp so as to form an internal shoulder on which the elastically deformable piece is suitable for bearing so as to hold said balloon portion against the shoulder. Thus, once the balloon has been inflated, the spar is secured to the balloon portion.

Advantageously, said plate-forming element is suitable for being fixed in adjustable manner on said spar, thereby enabling it to be given a position relative to the balloon that minimizes disturbance.

In a preferred embodiment of the invention, said plate-forming element presents cylindrical type curvature with its concave side being directed upstream relative to said air streams. Thus, the concave side of the plate-forming element constitutes an obstacle to air while the balloon is in the ascent stage.

In another preferred embodiment of the invention, said plate-forming element is pierced by orifices in such a manner as to create grating turbulence suitable for preventing said air streams from adhering to the surface of the bottom hemisphere of said balloon during ascent.

In another preferred embodiment of the invention, said plate-forming element presents two portions having mean planes that form an angle of less than 180°.

In this embodiment, the spoiler comprises two plane faces facing each other at an angle which can be selected to have arbitrary value, said surfaces optionally being of different dimensions so that under the effect of forces due to the speed of ascent a torque is created tending to cause the balloon to turn, thereby causing the turbulent disturbance of the wake to propagate laterally in more effective manner.

Advantageously, in order to achieve the same result, said plate-forming element is fixed in said wall portion of said balloon in such a manner that the mean plane of said element is inclined relative to the horizontal so as to cause said balloon to rotate about its vertical axis during ascent.

Preferably, said plate-forming element presents a longitudinal slot.

Thus, in accordance with these characteristics of the invention, said spoiler is constituted by one or more plane or concave surfaces which are used for disturbing air flow over the top portion of the balloon during its ascent, said surfaces being held rigidly secured to the wall of the balloon. Thus, the aerodynamic forces applied to said spoiler are transferred to the balloon and modify the way it moves.

In order to ensure that said spoiler does indeed transmit the forces to which it is subjected, it is rigid relative to the aerodynamic stresses. However, advantageously, said spoiler is elastically deformable and is made of a flexible material so as to be capable of deforming without damaging the envelope of the balloon in the event of coming into contact therewith on launching.

BRIEF DESCRIPTION OF THE DRAWING

Other features and advantages of the invention will appear on reading the following description given by way of non-limiting indication and made with reference to the accompanying drawings, in which.

DESCRIPTION OF THE PREFERRED EMBODIMENTS

Figure 1:
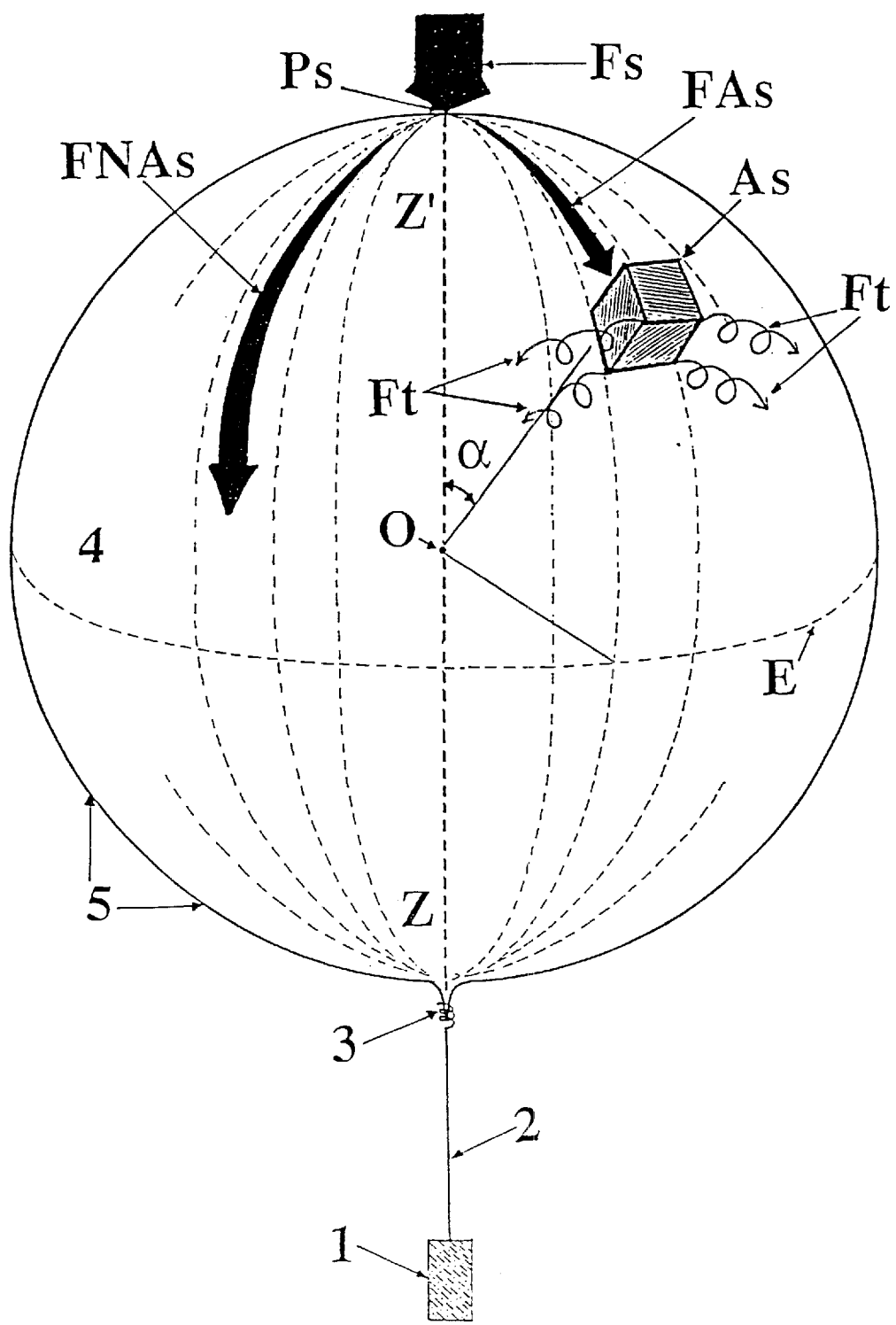
FIG. 1 shows the general case of the device of the invention mounted on a weather balloon and how the spoiler fixed on the top hemisphere of the balloon operates during the ascent stage.

FIG. 1 shows the configuration of the device of the invention and how it operates during the ascent stage. The sonde 1 for measuring wind speed is suspended beneath the balloon 4 by means of a cord 2 connected to the sleeve 3 used for filling the balloon with gas, said balloon having a center 0 and an elastic envelope 5. The envelope 5 has a spoiler As rigidly secured to its hemisphere which is at the top of the balloon during the ascent stage,:which spoiler is not deformable under the action of the aerodynamic forces to which it is subjected.

During ascent, streams of air Fs encountering the top pole Ps of the balloon are deflected so as to travel around it. As mentioned above, the streams FNas which do not encounter the spoiler As on their path adhere firmly to the walls of the balloon under supercritical conditions until they reach its bottom surface.

In contrast, all of the air streams FAs which encounter the spoiler As are deflected, giving rise, downstream from As, to turbulent streams Ft which constitute a wake. These streams extend behind the obstacle in multiple directions, and because of their turbulent nature they contribute to preventing the air flow from adhering closely to the wall of the balloon over a large fraction of its bottom hemisphere thus having the effect, as mentioned above, of reducing unwanted movements of the balloon and thus of enabling good measurements to be made of wind speed. To enable the spoiler As to be effective, it is therefore necessary for the air streams FAs to strike the walls of the spoiler As at a large angle, which means that the spoiler must not be too close to the top pole Ps of the balloon. Similarly, in order to ensure that the turbulent wake can act effectively downstream from the spoiler As, it is also necessary for the spoiler not to be situated near the equator E of the balloon. Under such circumstances, the angle $\alpha$ between the line O,As and the vertical axis zz' of the balloon is advantageously restricted to values that are not close to 0° or to 90°. As explained in the description above, the stabilizing effect increases with increasing wake size.

Figure 2:
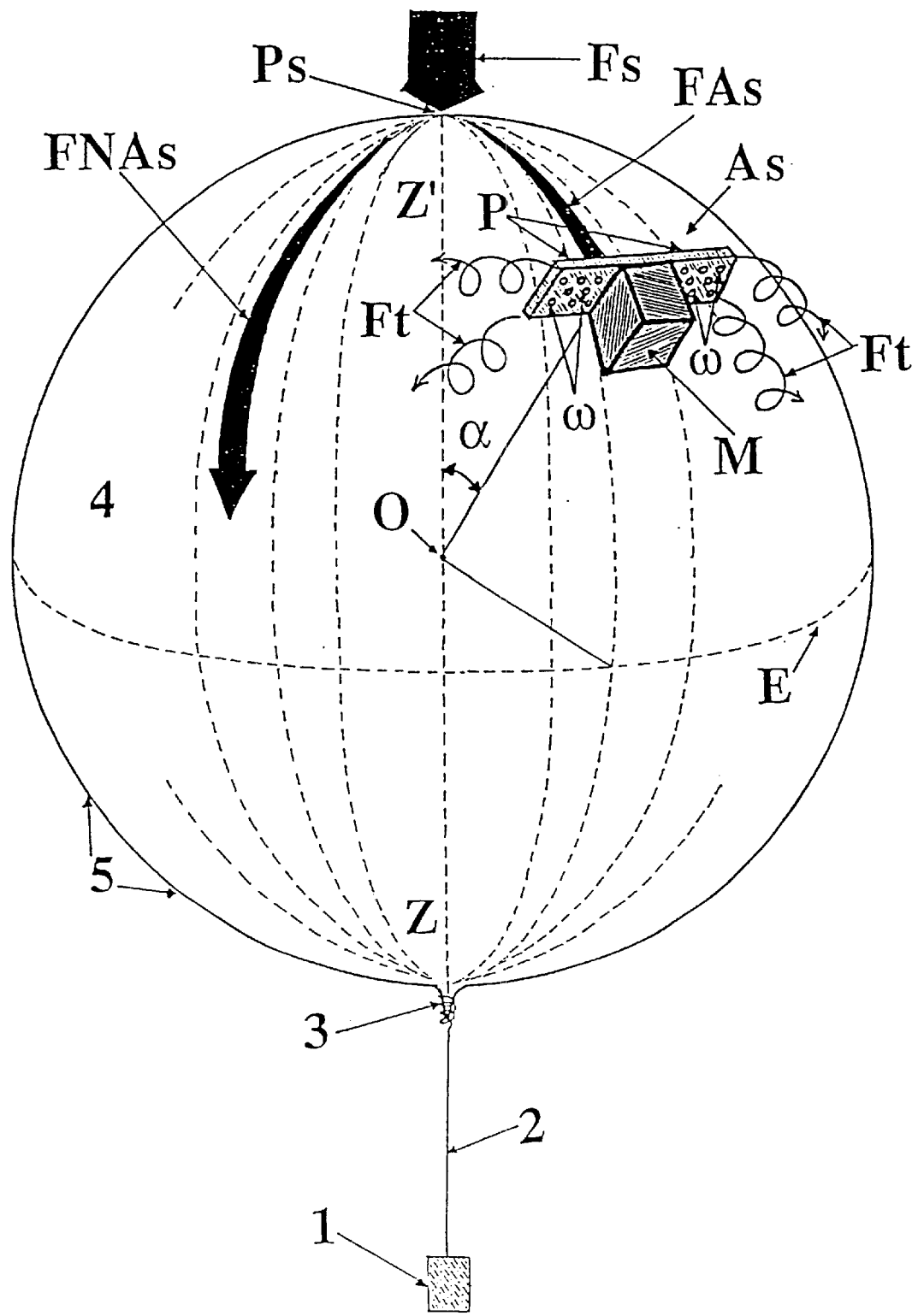
FIG. 2 shows an embodiment in which the spoiler is constituted by a plate having sharp edges and pierced by orifices, which plate is secured to the envelope of the balloon and is placed in such a manner that the angle it makes relative to the envelope enables it to constitute an obstacle to the flow of air around the balloon, the plate itself being fixed on a part which is secured to the envelope of the balloon in such a manner that any aerodynamic force applied to the plate has direct repercussions on the movement of the balloon.

FIG. 2 shows an embodiment of the invention in which the spoiler As is constituted by a plate P of small thickness compared with its other dimensions and therefore constituting an obstacle with sharp edges. This plate is fixed on a spar M secured to the envelope of the balloon.

In this embodiment which is not limiting in any way, the plate P which is generally rectangular in shape projects beyond the spar M and is directed to face the air stream flow. Under these conditions, the wake behind the plate is much larger in size than the wake produced by the spar M on its own and is of much greater density because of the sharp edges of the plate P. This has the result of the stabilization effect on the balloon being larger since the turbulent streams Ft spread more quickly over the sides of the plate P than they would if the spar M was the only obstacle. In order for the system to be effective, it is necessary for the plate P to be made out of a material that is sufficiently rigid to ensure that the aerodynamic pressure forces to which it is subjected, and which are associated with the speed of ascent of the balloon, are transferred in full to the balloon itself. In addition, as already explained above, it is necessary for the angular position of the plate P and of the spar M, as measured by the angle cc to have a value such that the streams FAs reaching it are subsequently well separated from the envelope of the balloon. To further improve the effectiveness of the plate P, a series of orifices m are pierced through it so that the incident air streams FAs give rise to grating turbulence downstream, thereby enabling the air streams to separate more easily and further increasing stability.

Figure 3:
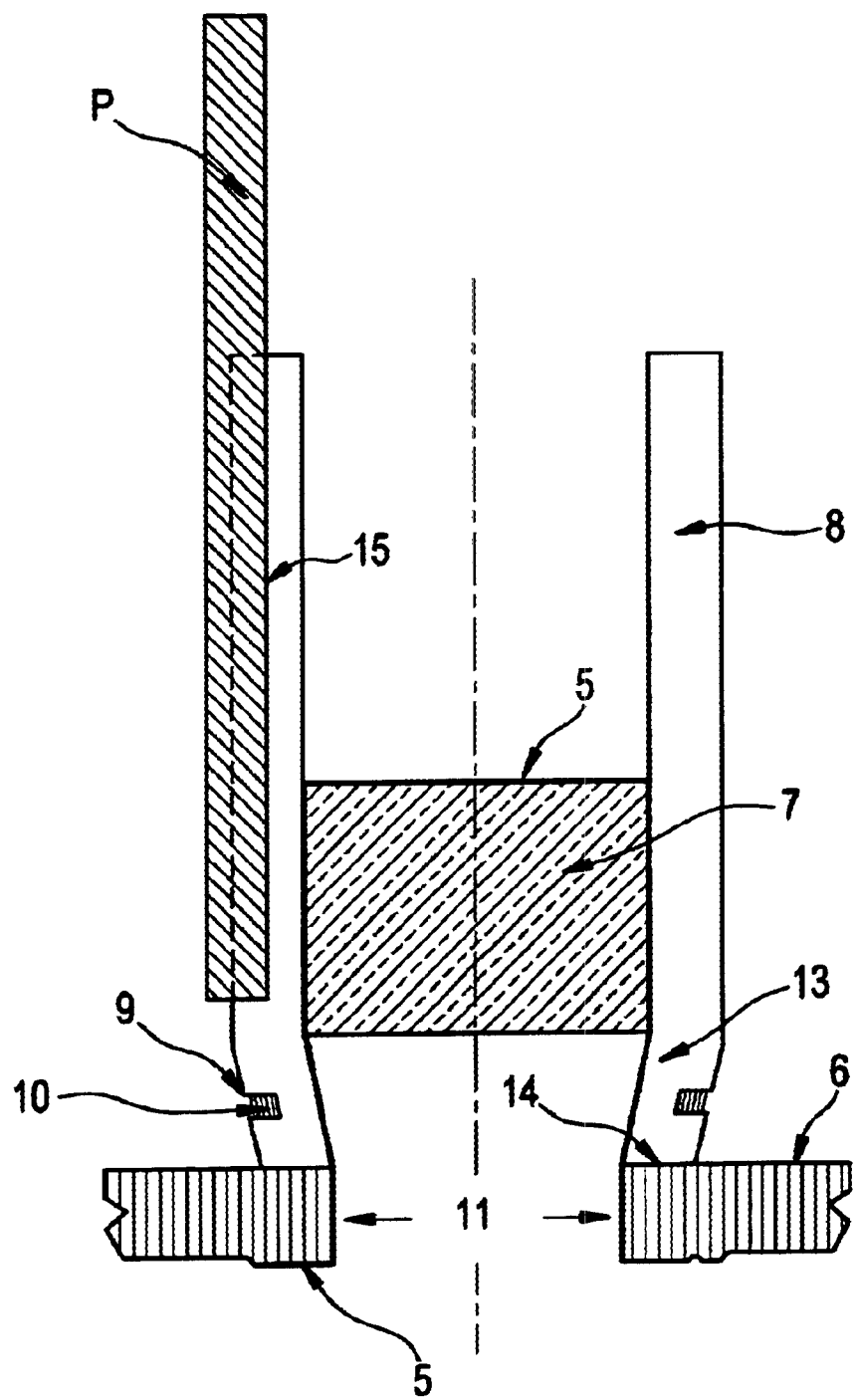
FIG. 3 shows how the plate that is used for creating a downstream turbulent wake for separating the air streams is fixed to the envelope of the balloon.

By way of example, FIG. 3 shows one particular embodiment of the invention for the plate and spar system that is used for separating the air streams. The spar M shown in FIG. 2 comprises an assembly of four parts.

The first is a cylindrical sleeve which is advantageously made out of a material which is both rigid and deformable, such as a polyurethane type foam, said sleeve being secured to the envelope 5 by a system which is described below.

In the internal cylinder of the sleeve 8 there is a cylindrical and elastically deformable part 7 which is initially inserted into the inside of the balloon 4 via its inflation sleeve 3. The part 7 is also made of a material that is rigid but deformable, and its diameter is slightly smaller than the inside diameter of the sleeve 8 so that when a thickness of the envelope 5 is sandwiched between the part 7 and the sleeve 8, there remains no clearance between these two parts.

The part 7 is inserted into the sleeve 8 by passing through a circular orifice 11 situated in a plane part 6 which becomes sandwiched between the envelope 5 of the balloon and the bottom end 14 of the sleeve 8. The diameter of the circular orifice 11 must be less than the outside diameter of the sleeve 8 for reasons explained below. In the bottom portion of the outside surface of the sleeve 8 there is formed a groove 9 which receives a shrinkable clamp or collar 10. Once tightened, the collar 10 co-operates with the elasticity of the material constituting the sleeve 8 to reduce the inside diameter of said sleeve 8 to a value which is less than the diameter of the part 7 which is thus prevented from escaping downwards from its housing. These parts are put into position while the balloon is empty of gas so the envelope 5 is not subjected to any tension.

Once the balloon 4 begins to take on a spherical shape during inflation, tension is developed in the envelope 5 tending to press the part 7 against the portion 13 of the sleeve 8 that has been narrowed by the collar 10. This tension force also presses the bottom end 14 of the sleeve 8 against the plane part 6. A flat can be provided on the outside wall 15 of the sleeve 8 and the plate P of FIG. 2 can be stuck thereon so as to constitute the aerodynamic obstacle, however this fixing can be implemented by any means that enable the plate P to be secured to the sleeve 8 before the balloon is released. Once the balloon 4 has been inflated and before it is launched as a sonde, the envelope 5 thus ensures that the spar M and the plate P are held to the envelope by means of its elastic tension forces, it being understood that the part 7 cannot escape through the orifice 11, thereby holding the plane part 6 between the sleeve 8 and the balloon, the plane part 6 serving as a support on the balloon for the spoiler As that acts as an aerodynamic obstacle.

A second embodiment of the invention consists in replacing the collar 10 with a stretched elastic band with one or more turns occupying the groove 9, thereby generating resilient forces which prevent the part 7 from leaving the sleeve 8.

Figure 4:
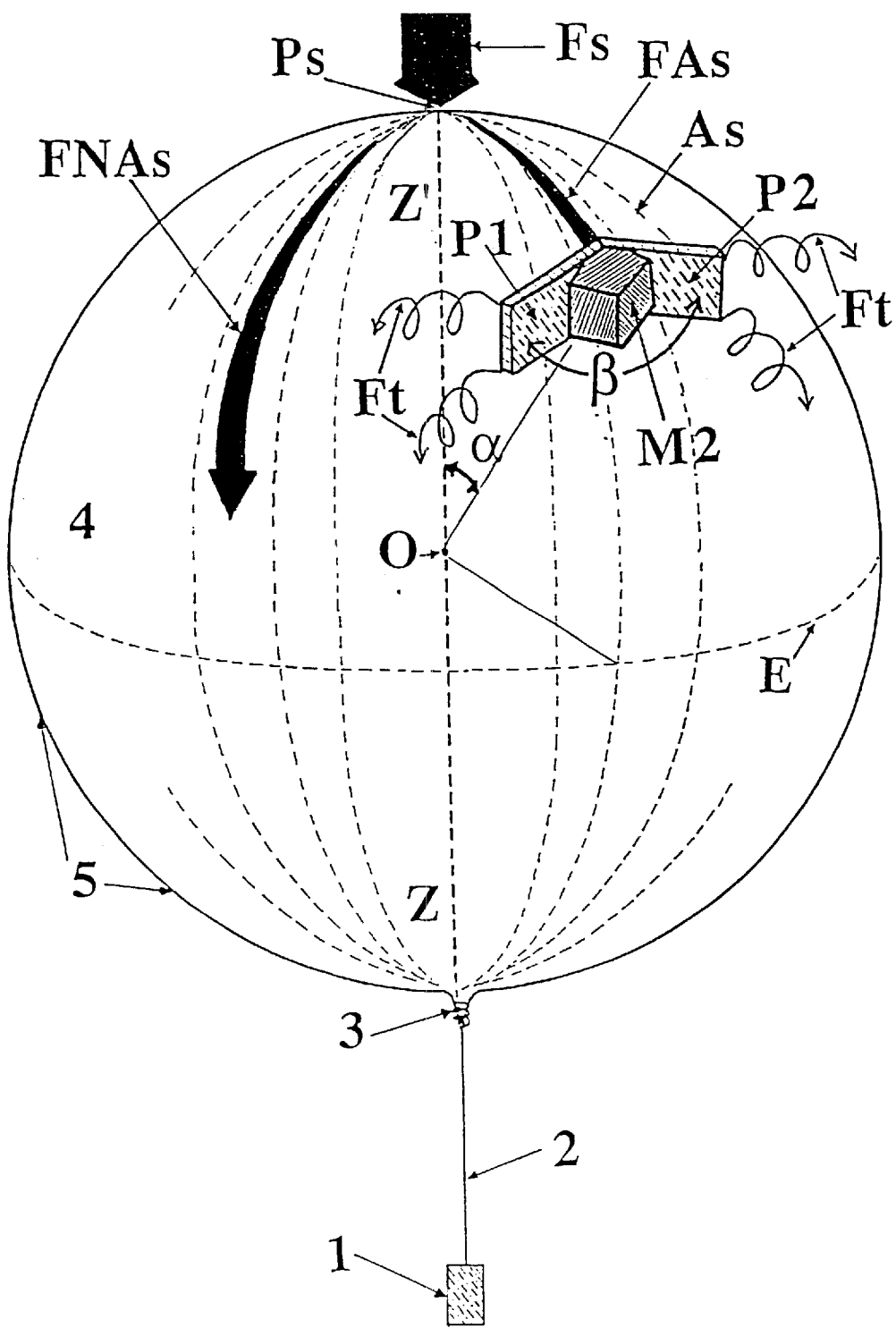
FIG. 4 shows a preferred embodiment of the invention in which the spoiler is now constituted by two plane plates which are secured to the envelope by means of a part of the type shown in FIG. 3, the two plates being at a non-zero angle relative to each other, having sharp edges, and constituting an obstacle to the flow of air around the balloon.

FIG. 4 shows a second embodiment of the spoiler forming the obstacle As, again in non-limiting manner.

In this case, the spoiler As comprises two fine plates P1 and P2 which are secured to a spar M2 fixed to the envelope 5. The plates P1 and P2 extend relative to the surface of the balloon in such a manner as to constitute obstacles to the air streams FAs which come down from above, and between them they form an angle β which can be of arbitrary value but which more advantageously is less than 180°. These plates P1 and P2 are secured to a spar M2 of the same type as that shown in FIG. 3 except that in this embodiment it has two flats at an angle of β to each other in the sleeve 8 so as to enable the plates P1 and P2 to be secured thereto. When the air streams FAs flowing around the balloon reach the spoiler As, they are split on the plates P1 and P2 so as to constitute streams Ft which diverge at the angle β between the two plates so that their effect on downstream separation is greater than that when using a single plane plate. In addition to improved effectiveness in stabilizing the balloon, this configuration provides two other advantages. Firstly it ensures that the downstream wake is symmetrical, thereby improving the aerodynamic drag coefficient of the balloon. Secondly, by using plates P1 and P2 of different areas, the resultant of the aerodynamic force acting on them due to the ascent speed creates torque tending to cause the balloon to turn around its vertical axis zz' in a direction and at a speed that depends solely on the relative areas of the plates Pi and P2. This rotation thus serves to further improve separation of the streams Ft.

In an example having a single plate as shown in FIG. 2, it is also possible to set the balloon into rotation about the vertical axis zz' by orienting the plane surface P secured to the spar M on the balloon in such a manner that the streams FAs which were following parallel paths along generator lines g of the balloon prior to striking the obstacle meet the plate P with an oblique angle of incidence, thereby giving rise to torque causing the balloon to turn.

Figure 5:
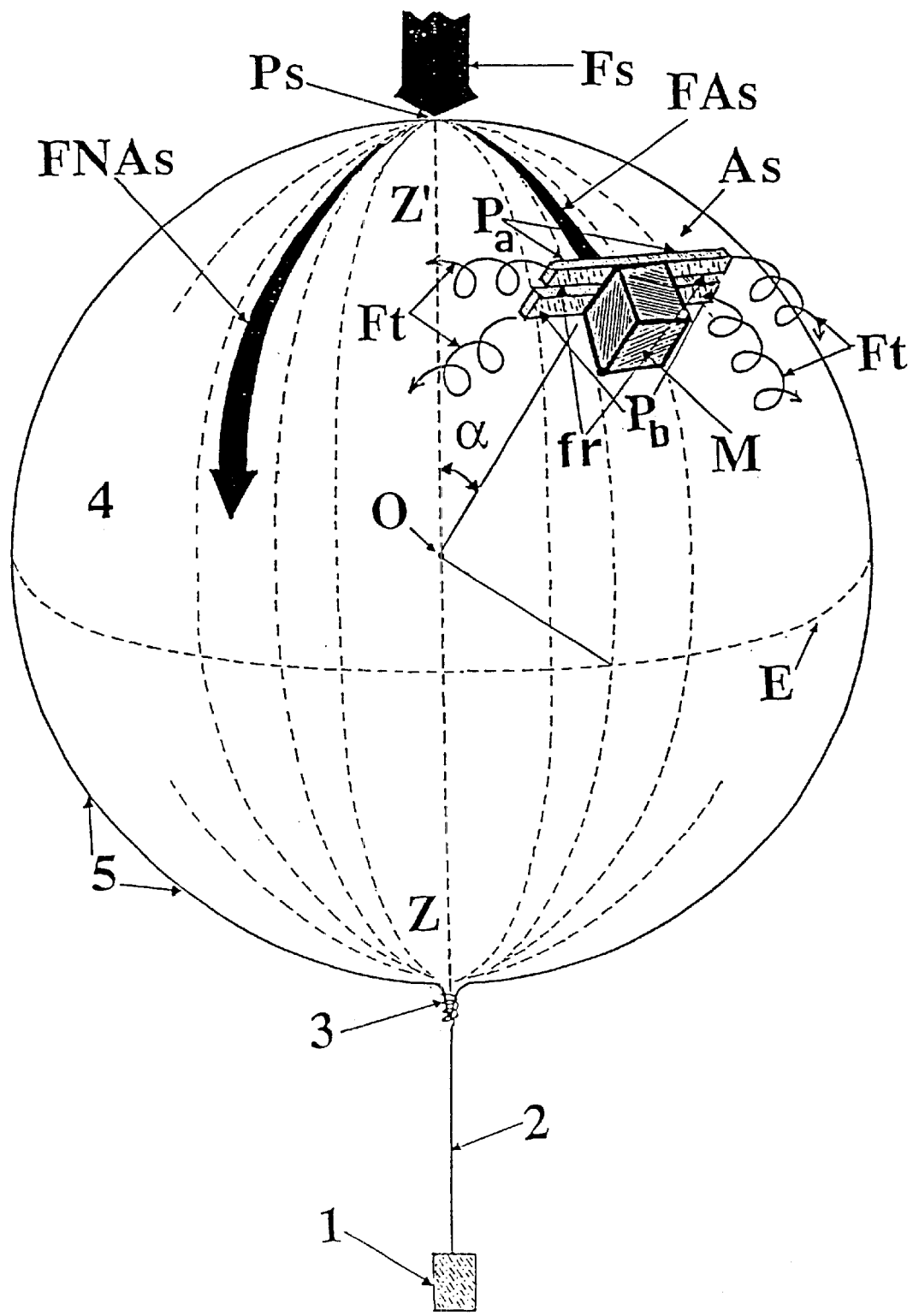
FIG. 5 shows another preferred embodiment of the invention.

FIG. 5 shows another embodiment in accordance with the invention for the obstacle which serves to separate the air streams from the surface of the balloon and thus to stabilize the balloon during ascent. In this embodiment, the obstacle comprises two parallel plates Pa and Pb with a rectangular slot fr left empty between them. Some of the incident air stream passing through the slot fr, thereby gives rise to turbulent streams Ft downstream therefrom which separate from the wall of the balloon.

Figure 6:
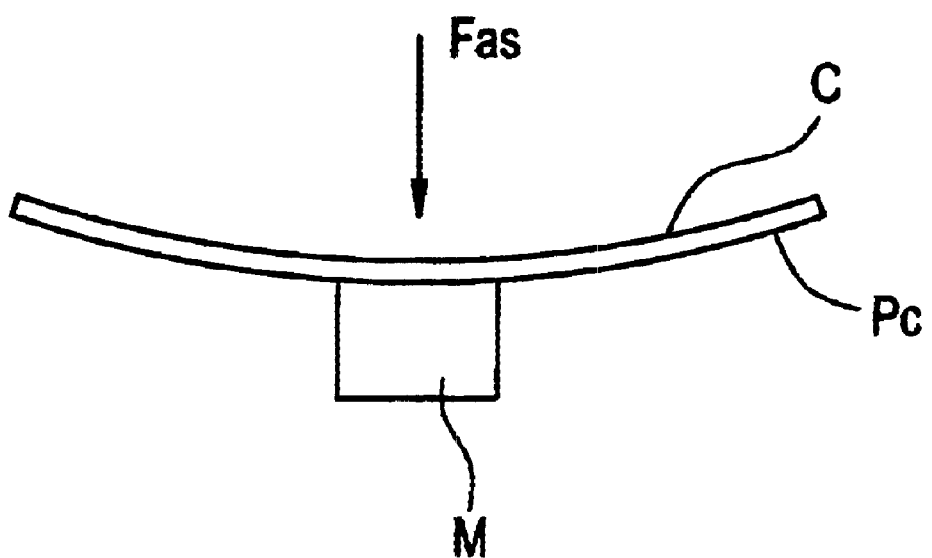
FIG. 6 shows a further preferred embodiment of the invention.

FIG. 6 shows an embodiment in which the plate-forming element Pc secured to spar M presents a cylindrical curvature with a concave side C directed upstream relative to air streams FAs.

What is claimed is:

1. A meteorological balloon having improved wind measurement during an ascent stage, the balloon comprising:
    an inflatable envelope having, during ascent, an upper hemisphere and a lower hemisphere, and presenting an outer surface,
    a GPS type sonde secured to the inflatable envelope, and
    a device for improving wind measurement comprising a single spoiler secured to the upper hemisphere of the envelope, said spoiler being constructed and arranged to transmit any aerodynamic force acting thereon to said balloon and to modify air streams following the outside surface of said balloon so as to prevent the air streams from adhering to the outer surface of the bottom hemisphere of said balloon during ascent.

2. A balloon according to claim 1, wherein said spoiler comprises a plate element having sharp edges and having a mean plane that intersects the outer surface.

3. A device according to claim 1, wherein the spoiler comprises a spar secured to said envelope.

4. A balloon according to claim 3, wherein said spar comprises an internal shoulder formed by an external clamp, and said device further comprises an elastically deformable part inside said balloon engageable inside said spar so as to bear against said internal shoulder and pinch said envelope between said part and said spar, thereby fixing said spar to the outer surface.

5. A balloon according to claim 3, further comprising a plate element fixable in an adjustable manner on said spar.

6. A balloon according to claim 2, wherein said plate element comprises orifices for creating grating turbulence for preventing the air streams from adhering to the outer surface of the bottom hemisphere during ascent.

7. A balloon according to claim 2, wherein said plate element comprises two portions having mean planes that form an angle of less than 180°.

8. A balloon according to claim 2, wherein said plate element is fixed to said outer surface in such a manner that the plate element has a mean plane inclined relative to a horizontal orientation during ascent, whereby said balloon rotates about its vertical axis during ascent.

9. A balloon according to claim 2, wherein said plate element comprises a longitudinal slot.

10. A balloon according to claim 1, wherein said single spoiler is elastically deformable.

11. A balloon according to claim 6, wherein said plate element is fixed to said outer surface in such a manner that said element has a mean plane inclined relative to a horizontal orientation during ascent, whereby said balloon rotates about its vertical axis during ascent.

12. A balloon according to claim 3, wherein said plate element comprises orifices for creating grating turbulence for preventing the air streams from adhering to the surface of the bottom hemisphere of said balloon during ascent.

13. A balloon according to claim 3, wherein said plate element is fixed to said outer surface in such a manner that said element has a mean plane inclined relative to a horizontal orientation during ascent, whereby said balloon rotates about its vertical axis during ascent.

14. A balloon according to claim 4, wherein said plate element comprises orifices for creating grating turbulence for preventing the air streams from adhering to the surface of the bottom hemisphere of said balloon during ascent.

15. A balloon according to claim 5, wherein said plate element is fixed to said outer surface in such a manner that said element has a mean plane inclined relative to a horizontal orientation during ascent, whereby said balloon rotates about its vertical axis during ascent.

16. A balloon according to claim 2, wherein said plate element presents generally cylindrical curvature with a concave side being directed upstream relative to the air streams.

* * * * *